June 17, 1952  R. E. ELLETT  2,601,107
ARTIFICIAL EYE FOR FIGURE TOYS
Filed Jan. 19, 1949
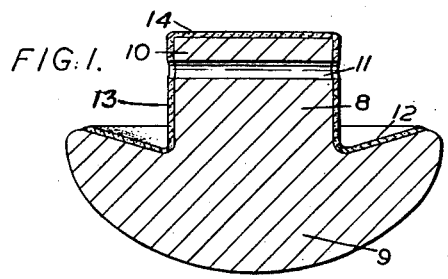
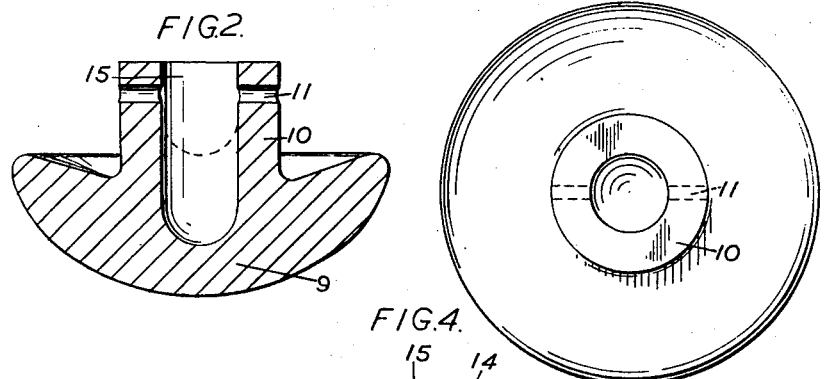
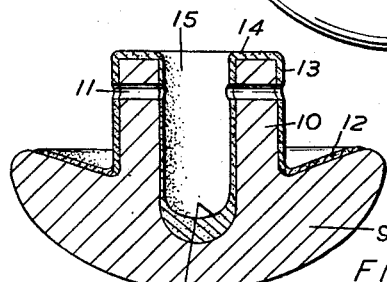
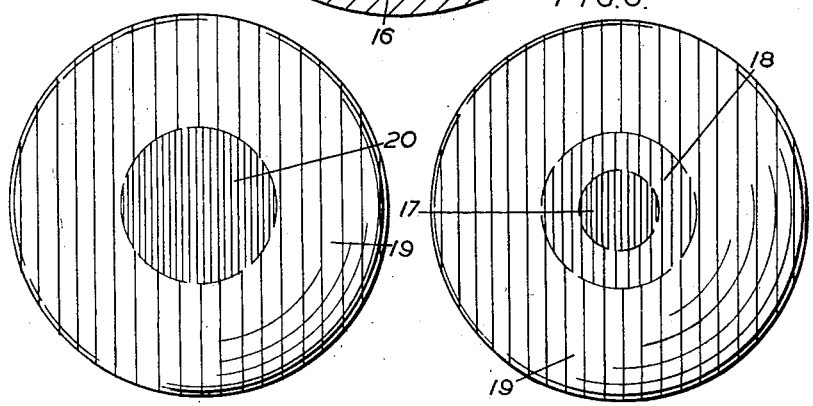
*Inventor*
RICHARD EVANS ELLETT
By
*Agent*

Patented June 17, 1952

2,601,107

UNITED STATES PATENT OFFICE 2,601,107

ARTIFICIAL EYE FOR FIGURE TOYS

Richard Evans Ellett, Merton, London, England

Application January 19, 1949, Serial No. 71,620
In Great Britain December 6, 1948

5 Claims. (Cl. 46—165)

The present invention relates to improvements in artificial eyes for toy animals, dolls and the like and it has for its objects to provide an article of realistic appearance which can be produced expeditiously and at a low cost and which may be fixed in position without using fixing wires extending rearwardly of the eye element, with the consequent danger to children from said wires.

In accordance with the present invention an artificial eye is formed by molding from transparent or translucent material and embodies a reduced stem portion at the rear apertured to permit fixing by stitching and which reduced stem portion is colored by the superficial application of coloring material thereto so as to provide for simulating the iris or iris and pupil and being preferably contrastingly colored to the portion surrounding it.

The present invention also comprises an artificial eye molded from a transparent or translucent molding composition which embodies a reduced stem portion at the rear provided with a coaxial recess and which stem portion is traversed by an aperture to permit the eye to be fixed by stitching, and colored by the application of coloring material such as paint or the like to the rear surface of the eye, to the stem and so as at least partially to fill in the coaxial recess whereby a variety of pleasing effects may be obtained. In this form it is readily possible to secure the effect of a pupil distinct from the iris by allowing the coloring material to fill into the recess so as to form a comparatively opaque mass while the rest of the outer surface of the stem including its end face, being relatively thinly covered with the coloring material, has a relatively light appearance seen from the front. The peripherally extending under face of the eye element surrounding the stem may be colored in a contrasting manner. By appropriate choice of such coloring artificial eyes may be produced suitable to represent different toy animals as well as dolls.

The artificial eyes according to the invention are produced by suitable and appropriate molding processes and with suitable transparent or translucent molding compositions. In most cases the moldings are substantially colorless in the natural state i. e. before finishing, although the invention also includes the production of artificial eyes from suitably colored molding compositions. In general the outer surface of the eye is convexly curved and is preferably of circular form although eyes of elliptical or other shapes may be produced if desired. The convex curving of the front of the eye gives a lens-like effect and in the case where the stem is provided with a coaxial recess it may have the effect of apparently bringing forward the base of said recess towards the front outer surface of the eye especially where the manner of painting is such as to emphasize this effect as explained hereinafter.

The artificial eyes according to the invention may be produced from transparent or translucent thermosetting molding compositions such as urea-formaldehyde products or from thermoplastic transparent or translucent compositions such as cellulose acetate or cellulose nitrate plastics or acrylic resin compositions; in the case of thermoplastic materials they may be produced by injection molding.

In order that the invention may be fully understood reference will now be directed to the accompanying drawings showing preferred embodiments thereof and wherein:

Fig. 1 is a cross section of one form of artificial eye according to the invention;

Fig. 2 is a cross section of a modified form of an artificial eye according to the invention before painting;

Fig. 3 is an end view of Fig. 2 from the rear;

Fig. 4 shows a cross section of the artificial eye shown in Fig. 2, painted and

Figs. 5 and 6 are front views showing the appearance of artificial eyes produced according to the invention.

Referring to Fig. 1 this shows an artificial eye in section comprising a molding 8 of transparent or translucent material having a disc-like front 9 which is convexly curved to have the appearance of an eyeball and a stem portion 10 at the rear which is pierced by a transverse aperture 11 to permit the eye to be fixed to the toy, doll or the like by stitching.

The underside of the eyeball lying around the stem 10 has a coating of coloring material 12, such as paint or the like, applied thereto and the stem 10 is likewise covered with paint around the peripheral face as at 13 and across the end face as at 14. Preferably the color of the paint at part 12 is differently colored from the parts 13 and 14. These latter parts are preferably of the same color although the peripheral face 13 could if necessary be differently colored from the end face 14.

By virtue of this construction artificial eyes may be produced of desired appearance characteristics and according to the type of toy animal or doll to which the eye is to be applied. It will be realized that the painting of the surfaces 12, 13 and 14 may be readily and quickly effected, and in particular where the parts 13 and 14 are of the same color a single application of paint with a brush will suffice to complete the operation.

Figs. 2 and 3 show in section and in rear view a construction of a molded blank before painting. In this case the blank comprises a convex disc-like portion 9, a stem 10, and a coaxial recess 15 extending from the rear face of the stem. The annular rear face of portion 9 may be flat or cone-shaped as shown. The depth of the recess 15 may be relatively slight as indicated by the dotted lines or it may extend for a substantial depth, for example beyond the rear face of the part 9 as indicated in full lines. The stem is traversed by an aperture 11 permitting fixing of the finished eye to the toy or doll by stitching. Fig. 4 illustrates the artificial eye of Figs. 2 and 3 after completion thereof by means of applied paint or other coloring material. The rear of the portion of the eye surrounding the stem 10 is colored or painted as shown at 12 while the stem 10 and the central recess 15 are covered by paint layers 13, 14 and 16. The layer 13 covers the peripheral face of the stem 10, the layer 14 the end face thereof and the part 16 fills into the recess 15. According to the amount of paint applied a relatively thick coat may form within the base of the recess 15 as shown at 16 and if the paint or like coloring material used is relatively thin or relatively transparent, the color produced by the thickened part 16 may appear darker when seen from the front than the rest of the eye. This arrangement permits a dark pupil to be provided at the centre of the eye as indicated in the front view of Fig. 6 at 17, said dark pupil being surrounded by a lighter portion 18 to represent the iris, the whole being surrounded by a part 19 to represent the surrounding eyeball thus giving a realistic appearance for particular types of animals or for dolls. Fig. 5 represents the appearance of the eye where the depth of paint at the parts 16 is not utilized to give a darker pupil. This result may be obtained for example by using a comparatively opaque paint or by not allowing the paint to fill in to form the thickened section as shown at 16, Fig. 4. In this case the eyeball portion 19 surrounds a single central pupil-like part 20. Of course by appropriate choice of the coloring of the paint 12 and of the parts 13, 14 and 16 artificial eyes of various desired colors may be produced.

What I claim is:

1. Eye for toy animals, comprising a single block of light-transmissive material, said block including a head portion having a convex front face and a substantially ring-shaped rear face, a cylindrical stem projecting rearwardly at the center of said head portion, the stem having a diameter equal to the desired iris diameter, a bore in said stem extending inwardly and nearly to said convex front face, with the axis of the bore coinciding with the axis of the stem, the diameter of the bore being equal to the desired pupil diameter, an annular surface between the edge of the bore at the free or rear end of the stem and the edge bounding the stem, coloring material on the rear face of the head portion to simulate the eyeball, coloring material on said annular surface to simulate the iris, and coloring material in said bore to simulate the pupil.

2. In the eye according to claim 1, the same coloring material on said annular surface and in said bore, the coloring material in the bore forming a thicker section.

3. In the eye according to claim 1, coloring material on said annular surface and in said bore to simulate a pupillike center of a diameter equal to the iris diameter.

4. In the eye according to claim 1, coloring material on the outer wall of the stem.

5. In the eye according to claim 1, the stem being provided with a transversally extending aperture to permit fixing of the eye by stitching.

RICHARD EVANS ELLETT.

REFERENCES CITED

The following references are of record in the file of this patent:

UNITED STATES PATENTS

| Number | Name | Date |
|---|---|---|
| 2,254,232 | Marcus | Sept. 2, 1941 |

FOREIGN PATENTS

| Number | Country | Date |
|---|---|---|
| 13,795 | Great Britain | June 9, 1911 |
| 466,566 | Germany | Oct. 5, 1928 |